Patented Mar. 9, 1948

2,437,258

UNITED STATES PATENT OFFICE 2,437,258

ISOPRENE ESTERS

Franklin D. Jones, Llanerch, Pa., assignor to American Chemical Paint Company, Ambler, Pa., a corporation of Delaware No Drawing. Application March 5, 1943, Serial No. 478,123

4 Claims. (Cl. 260—469)

This invention is directed to a new class of organic compounds. Stated more specifically, the invention deals with the isoprene esters of certain acids, which belong to a class of acids known as "plant hormone acids."

By way of introduction, it may be stated that the plant hormone acids are acids of closely related chemical structure, which exhibit the property of being able to influence, regulate or control the growth of plants, even when present in minute concentration. Certain of the derivatives of plant hormone acids such as the amides, thioamides, nitriles, lower alkyl esters and alkali metal and ammonium salts exhibit similar properties, while other derivatives such as the chlorides, aldehydes, alcohols and ketones apparently do not.

This invention is concerned particularly with the isoprene esters of the plant hormone acids selected from the group consisting of naphthyl acetic acid, indole acetic acid, naphthoxy acetic acid, dichlorphenoxy acetic acid, 2-methyl naphthyl 1-acetic acid, 4-methyl naphthyl 1-acetic acid, 1,2,3,4-tetrahydronaphthyl 6-acetic acid (also known as 5,6,7,8-tetrahydronaphthyl 2-acetic acid), naphthoxy propionic acid, dichlorphenoxy propionic acid, naphthyl butyric acid, indole butyric acid, naphthoxy butyric acid and dichlorphenoxy butyric acid. By the term "isoprene ester" of a given plant hormone acid is meant the particular plant hormone acid ester of isoprene alcohol. This alcohol is sometimes referred to in textbooks and chemical literature as dimethyl vinyl carbinol or 2-methyl-2-hydroxy butene-3.

The following are the structural formulae of the isoprene esters of the invention:

Isoprene-1-naphthyl acetate

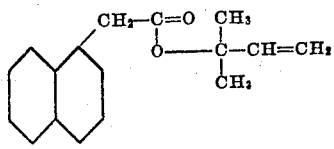

Isoprene indole acetate

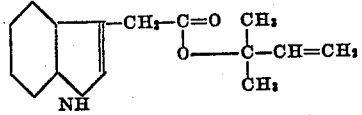

Isoprene 2-naphthoxy acetate

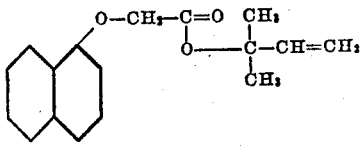

Isoprene 2,4-dichlorphenoxy acetate

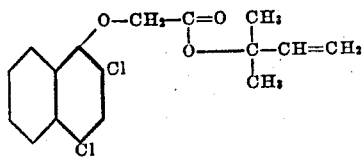

Isoprene 2-methyl naphthyl 1-acetate

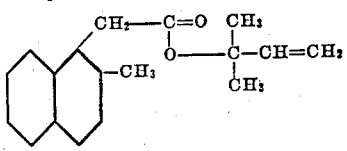

Isoprene 4-methyl naphthyl 1-acetate

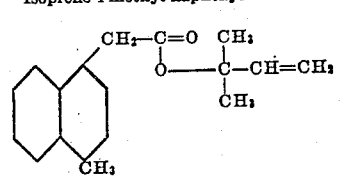

Isoprene 1,2,3,4-tetrahydronaphthyl 6-acetate

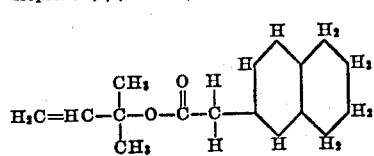

This compound is also known as:

Isoprene 5,6,7,8-tetrahydronaphthyl 2-acetate

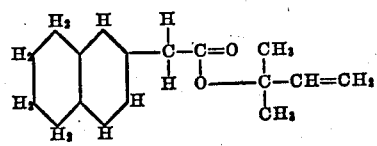

Isoprene beta-naphthoxy alpha propionate

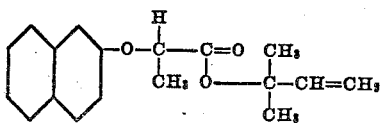

Isoprene 2,4-dichlorphenoxy alpha propionate

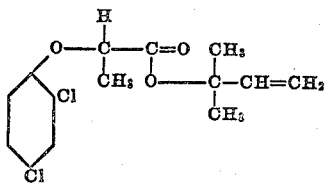

Isoprene 1-naphthyl alpha butyrate

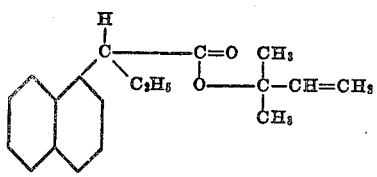

Isoprene 1-naphthyl gamma butyrate

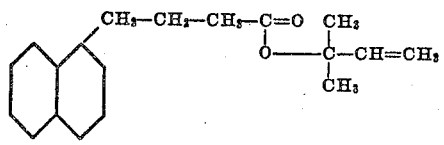

Isoprene indole gamma butyrate

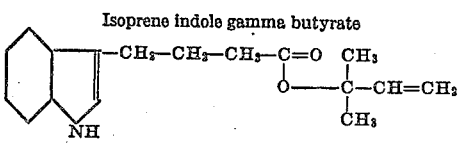

Isoprene beta naphthoxy alpha butyrate

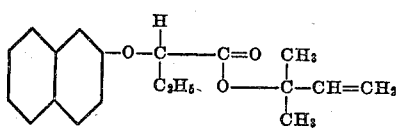

Isoprene 2,4-dichlorphenoxy butyrate

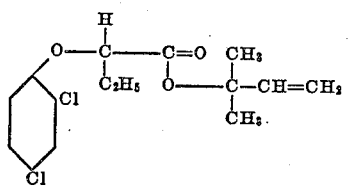

The isoprene esters are light yellow oils or light brown solids. For instance, the naphthyl esters are yellow oils and the indole esters are brown solids. The indole esters have no odors, while the naphthyl esters have fragrant somewhat minty odors. The esters decompose on heating, and the melting and boiling points have therefore not been determined.

There are various ways of synthesizing the isoprene esters, but the most practical and economical method from a commercial standpoint appears to be to react isoprene hydrochloride with the silver salt of the particular hormone acid. Isoprene hydrochloride may be made by the method disclosed in Patent No. 2,246,545, issued June 24, 1941, to Frank J. Soday.

By way of illustration, the most preferable methods for synthesizing two of the esters will be described.

Isoprene-1-naphthyl acetate was made as follows:

Isoprene hydrochloride (52.3 grams) was refluxed with stirring with 147 grams of the silver salt of 1-naphthyl acetic acid in 1000 c.c. ether for two hours. The silver chloride was filtered off and the ether evaporated from the filtrate. The residue was extracted with petroleum ether. 52 grams of the isoprene ester were obtained from the extract; about 41% of the theoretical yield.

The product is a light yellow oil with a fragrant somewhat minty odor, and has a specific gravity of 1.0810 at 24° C. It decomposes on heating. Saponification with potassium hydroxide indicated a purity of 99%, and the residual naphthyl acetic acid had a melting point of 132-133° C., the same as that of the acid used in making the silver salt.

Isoprene 2,4-dichlorphenoxy acetate was made as follows:

Isoprene hydrochloride having a boiling point of 96-98° C. (26.2 grams) was refluxed with stirring with 82 grams of 2,4-dichlorphenoxyacetic acid silver salt (made from acid of 140-141° C. melting point) for one and a half hours. The precipitated silver chloride was filtered off, and the ether evaporated from the filtrate. The residue was extracted with petroleum ether. The extract yielded 36 grams of isoprene 2,4-dichlorphenoxy acetate, a yield of about 50%.

The product is a light yellow oil with a characteristic pleasant odor. It has a specific gravity of 1.137 at 27° C. and decomposes on heating. Saponification with potassium hydroxide indicates a purity of 98.8%, and the recovered dichlorphenoxy acetic acid has the same melting point as the acid originally used.

The isoprene esters of the invention are important in the field of horticulture in that they exhibit the property of being able to influence, regulate or control the growth of plants in somewhat similar manner as previously known plant hormones. In fact, these esters appear to constitute a new class of plant hormones, and may be used in substantially the same way. For instance, the esters and compositions containing the esters may be used to speed up the germination of seeds, and to stimulate the formation of roots, buds and flowers. They may also be used to produce seedless fruits without the use of pollen (parthenocarpy) and to prevent or retard the formation of the abscission layer on fruit trees, thereby preventing fruit drop.

The esters of the plant hormone acids have certain advantages over the acids themselves. For instance, the isoprene esters of the naphthalene acids are considerably more effective in the rooting of cuttings. In the same concentrations, they produce heavier rooting and a greater percentage of rooting, with considerably less danger of overdosage. The isoprene esters of the indole acids are apparently not as effective as the acids in rooting, but they are much more effective in causing stem elongation and in causing curvature in the standard avena (oat) coleoptile tests. Isoprene 2,4-dichlorphenoxy acetate is about twice as effective in the rooting of cuttings as is the plant hormone acid itself. In other words, the same degree of rooting can be obtained with about one-half the concentration required with the acid. Conversely the isoprene ester of dichlorphenoxy acetic acid is much more toxic than is the acid, and hence in this instance there is greater danger of overdosage.

The isoprene esters may be applied to plants in any one or more of the ways known to the art. For instance, they may be applied in the form of solutions or emulsions, or as vapors or very fine sprays, preferably with a solvent or dispersing agent. A permissible variation consists in soaking or dipping the plant to be treated in a solution, dispersion or emulsion containing one or more of the esters, or in dipping the plant in a dry or moistened powder or dust containing one or more of the esters.

The esters may be applied for the intended purpose in concentrations as low as one part in one million parts of solvent or liquid medium, and in concentrations as high as 50,000 parts per million. They may be applied in the form of powders or dusts in concentrations ranging from 1 to 20 parts of ester per 2,000 parts of dry vehicle such as talc.

The esters may be used in compositions containing other substances having some particular effect on plant life such as nutrients, fertilizers, vitamins, or substances which form vitamins in situ or which facilitate the production of vitamins in the plant. The added ingredients may be other plant hormones, and if considered desirable for a particular purpose fungicides or insecticides may be included with or without wetting agents such as "Alkanol," "Avirol," "Avitex," "Gardinol," "Tergitol," "Ultrawet," etc. An acidifying agent such as citric, tartaric, succinic, malic, maleic, fumaric and sulfamic acid may also be included. If the composition is to be in dry form, it may contain a powdered filter such as talc, bentonite, clay, kaolin, charcoal, ground carbon or wood flour. The filler renders it possible to use a liquid wetting agent, and in case the composition is applied to trees by spraying it serves to produce better adhesion of the composition to the tree, its fruit, leaves and flowers.

The term "plants" as used in the present disclosure and in the appended claims is intended to include plants, slips, leaf cuttings, stem cuttings, scions, tubers, roots, seeds, bulbs, seedlings, fruits and flowers, wherever the context permits.

I claim:
1. The isoprene ester of an acid selected from the group of plant hormone acids consisting of naphthyl acetic acid, indole acetic acid, naphthoxy acetic acid, dichlorphenoxy acetic acid, 2-methyl naphthyl 1-acetic acid, 4-methyl naphthyl 1-acetic acid, 1,2,3,4-tetrahydronaphthyl 6-acetic acid acid (also known as 5,6,7,8-tetrahydronaphthyl 2-acetic acid), naphthoxy propionic acid, dichlorphenoxy propionic acid, naphthyl butyric acid, indole butyric acid, naphthoxy butyric acid and dichlorphenoxy butyric acid.
2. Isoprene-1-naphthyl acetate.
3. Isoprene 2-naphthoxyacetate.
4. Isoprene 2,4-dichlorophenoxyacetate.

FRANKLIN D. JONES.

REFERENCES CITED

The following references are of record in the file of this patent:

UNITED STATES PATENTS

| Number | Name | Date |
|---|---|---|
| 2,229,948 | Weil | Jan. 28, 1941 |
| 2,204,213 | Grace | June 11, 1940 |
| 2,204,214 | Grace | June 11, 1940 |
| 2,079,416 | Manske | May 4, 1937 |

FOREIGN PATENTS

| Number | Country | Date |
|---|---|---|
| 252,160 | Germany | Oct. 15, 1912 |

OTHER REFERENCES

Contribution from Boyce Thompson Institute, vol. 8, #1, pp. 105 to 112 (1936), published by Boyce Thompson Inst. for Plant Research Inc., 1086 North Broadway, Yonkers, New York.

Stoutemyer et al., American Nurseryman, Dec. 1, 1942, vol. LXXVI, Nov. 11 (reprint submitted as "Exhibit 1").